US011632185B2

(12) United States Patent
Kobayashi et al.

(10) Patent No.: US 11,632,185 B2
(45) Date of Patent: Apr. 18, 2023

(54) SIGNAL PROCESSING METHOD, SIGNAL PROCESSING APPARATUS AND COMMUNICATION SYSTEM

(71) Applicant: NIPPON TELEGRAPH AND TELEPHONE CORPORATION, Tokyo (JP)

(72) Inventors: Takayuki Kobayashi, Musashino (JP); Masanori Nakamura, Musashino (JP); Fukutaro Hamaoka, Musashino (JP); Yutaka Miyamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 52 days.

(21) Appl. No.: 17/433,149

(22) PCT Filed: Jan. 31, 2020

(86) PCT No.: PCT/JP2020/003727
§ 371 (c)(1),
(2) Date: Aug. 23, 2021

(87) PCT Pub. No.: WO2020/175014
PCT Pub. Date: Sep. 3, 2020

(65) Prior Publication Data
US 2022/0149974 A1 May 12, 2022

(30) Foreign Application Priority Data

Feb. 28, 2019 (JP) .............................. JP2019-036315

(51) Int. Cl.
*H04L 27/01* (2006.01)
*H04J 14/06* (2006.01)
(Continued)

(52) U.S. Cl.
CPC .......... *H04J 14/06* (2013.01); *H04B 10/2507* (2013.01); *H04B 10/61* (2013.01); *H04L 27/01* (2013.01); *H04L 27/38* (2013.01)

(58) Field of Classification Search
CPC ..... H04J 14/06; H04B 10/2507; H04B 10/61; H04L 27/01; H04L 27/38
See application file for complete search history.

(56) References Cited

U.S. PATENT DOCUMENTS 6,658,063 B1 * 12/2003 Mizoguchi .......... H04L 27/2662
375/355
8,103,711 B1 * 1/2012 Li .................... H04B 10/25133
708/300

(Continued)

FOREIGN PATENT DOCUMENTS

JP 6319487 B1 5/2018

OTHER PUBLICATIONS

Rafael Rios-Müller, "Blind Receiver Skew Compensation and Estimation for Long-Haul Non-Dispersion Managed Systems Using Adaptive Equalizer", Journal of Lightwave Technology, vol. 33, No. 7, Apr. 1, 2015, pp. 1315-1318.

(Continued)

*Primary Examiner* — Tanya T Motsinger

(57) ABSTRACT

A receiver convolutes each of a real component and an imaginary component of each polarization of a polarization-multiplexed reception signal with an impulse response for compensating for frequency characteristics of the receiver and a complex impulse response for wavelength dispersion compensation, and generates, as input signals, the convoluted real component and imaginary component of each polarization and phase conjugations thereof, for each polarization. The receiver generates, for each polarization, a first addition signal obtained by multiplying each of the real component and the imaginary component of each polariza- (Continued)

tion by a complex impulse response, thereafter adding together the multiplied real component and imaginary component, and applying a phase rotation for frequency offset compensation to the added components, and a second addition signal obtained by multiplying each of the phase conjugation of the real component of and the phase conjugation of the imaginary component of each polarization by a complex impulse response, thereafter adding together the multiplied phase conjugations, and applying a phase rotation opposite to the phase rotation for frequency offset compensation to the added phase conjugations, and adds or subtracts a transmission data bias correction signal to or from a signal obtained by adding together the generated first addition signal and second addition signal.

6 Claims, 4 Drawing Sheets

(51) Int. Cl.
*H04B 10/2507* (2013.01)
*H04B 10/61* (2013.01)
*H04L 27/38* (2006.01)

(56) References Cited

U.S. PATENT DOCUMENTS

| | | | | |
|---|---|---|---|---|
| 9,190,066 | B2* | 11/2015 | Gao | G10L 25/90 |
| 11,476,949 | B2* | 10/2022 | Campos | H04B 10/616 |
| 2012/0134676 | A1* | 5/2012 | Kikuchi | H04J 14/06 |
| | | | | 398/65 |
| 2012/0224855 | A1* | 9/2012 | Liu | H04J 14/002 |
| | | | | 398/79 |
| 2015/0372766 | A1* | 12/2015 | Yoshida | H04B 10/61 |
| | | | | 398/208 |
| 2020/0007241 | A1* | 1/2020 | Miura | H04B 10/532 |
| 2020/0036440 | A1* | 1/2020 | Yamagishi | H04B 10/58 |
| 2022/0381695 | A1* | 12/2022 | Choi | H04N 5/23245 |
| 2022/0383892 | A1* | 12/2022 | Liou | H04R 25/353 |

OTHER PUBLICATIONS

C.R.S. Fludger and T. Kupfer. "Transmitter Impairment Mitigation and Monitoring for High Baud-Rate, High Order Modulation Systems", 42nd European Conference and Exhibition on Optical Communications, Sep. 18, 2016, pp. 256-258.

* cited by examiner

SIGNAL PROCESSING METHOD, SIGNAL PROCESSING APPARATUS AND COMMUNICATION SYSTEM

CROSS-REFERENCE TO RELATED APPLICATIONS

This application is a 371 U.S. National Phase of International Application No. PCT/JP2020/003727 filed on Jan. 31, 2020, which claims priority to Japanese Application No. 2019-036315 filed on Feb. 28, 2019. The entire disclosures of the above applications are incorporated herein by reference.

TECHNICAL FIELD

The present invention relates to a signal processing method, a signal processing device, and a communication system.

BACKGROUND ART

High-order multi-level high baud rate signals are sensitive to reflections, inter-lane skew, IQ imbalance, or the like, and therefore require precise calibration in transmitters and receivers. In a conventional technique, transfer functions of a transmitter and a receiver are estimated from a received known signal, and signal distortion is accurately compensated by a pre-equalization circuit of the transmitter and an equalization circuit of the receiver (e.g. see PTL 1). This technique is very effective for static waveform distortion factors and is essential for transmitting and receiving high-order multi-level signals.

However, for time-varying waveform distortion factors, such as changes in various devices over time and modulator bias, compensation needs to be performed by, for example, employing a multi-stage configuration of an adaptive equalizer. For example, in a conventional equalizer configuration (e.g. see NPL 1), a received complex signal is divided into a real part and an imaginary part, and wavelength dispersion compensation is performed for each part through complex signal processing. With such processing, IQ imbalance and skew in the receiver can be dynamically compensated even in the presence of signal distortion due to wavelength dispersion and in the presence of IQ mixing. However, this equalizer configuration cannot compensate for IQ imbalance and skew in the transmitter. Accordingly, the receiver needs to perform 2×2 MIMO (Multiple Input Multiple Output) signal processing (e.g. the GainIQ+Skew Control part in FIG. 2 of NPL 2) through real signal processing on each polarization component after performing demodulation processing.

CITATION LIST

Patent Literature

[PTL 1] Japanese Patent No. 6319487

Non Patent Literature

[NPL 1] Rafael Rios-Muller, Jeremie Renaudier, Gabriel Charlet, "Blind Receiver Skew Compensation and Estimation for Long-Haul Non-Dispersion Managed Systems Using Adaptive Equalizer", Journal of Lightwave Technology, Vol. 33, No. 7, April 2015, p. 1315-1318

[NPL 2] C.R.S. Fludger, T. Kupfer, "Transmitter Impairment Mitigation and Monitoring for High Baud-Rate, High Order Modulation Systems", 42nd European Conference and Exhibition on Optical Communications, September 2016, p. 256-258

SUMMARY OF THE INVENTION

Technical Problem

However, in the technique in NPL 2, the adaptive equalizer of the receiver has a multi-stage configuration. In the initial stage of this configuration, demodulation signal processing using an equalizer is performed. After the demodulation signal processing in the first stage has converged, the receiver operates a MIMO equalizer for intra-transmitter signal distortion compensation, which is located in the latter stage. For this reason, a problem arises in that the adaptation operation in the entire demodulation processing becomes more complex, and the adaptive signal processing converges more slowly. Furthermore, if a distortion component in the transmitter is large, adaptive equalization by the two equalizers oscillates or diverges in some cases.

In view of the foregoing circumstances, an object of the present invention is to provide a signal processing method, a signal processing device, and a communication system capable of increasing the processing speed of equalization processing for accurately performing distortion compensation.

Means for Solving the Problem

One aspect of the present invention is a signal processing method including: a first compensation step of convoluting each of a real component and an imaginary component of each polarization of a polarization-multiplexed reception signal with an impulse response for compensating for frequency characteristics of a receiver and a complex impulse response for wavelength dispersion compensation; an input signal generation step of generating, as input signals, the convoluted real component and imaginary component of each polarization, and phase conjugations of the convoluted real component and imaginary component of each polarization, for each polarization; an equalization step of generating, for each polarization, a first addition signal obtained by multiplying each of the real component and the imaginary component of each polarization included in the input signals by a complex impulse response, thereafter adding together the multiplied real component and imaginary component, and further applying a phase rotation for frequency offset compensation to the added components, and a second addition signal obtained by multiplying each of the phase conjugation of the real component of and the phase conjugation of the imaginary component of each polarization included in the input signals by a complex impulse response, thereafter adding together the multiplied phase conjugations, and further applying a phase rotation opposite to the phase rotation for frequency offset compensation to the added phase conjugations; and a second compensation step of adding or subtracting a transmission data bias correction signal to or from a signal obtained by adding together the first addition signal and the second addition signal, for each polarization.

One aspect of the present invention is the above-described signal processing method, wherein the receiver receives the polarization-multiplexed reception signal using an optical signal.

One aspect of the present invention is a signal processing method including: a first compensation step of convoluting each of a real component and an imaginary component of each polarization included in N (N is an integer of 2 or more) polarization-multiplexed reception signals that are spatially multiplexed with an impulse response for compensating for frequency characteristics of a receiver and a complex impulse response for wavelength dispersion compensation; an input signal generation step of generating, as input signals, the convoluted real component and imaginary component of each polarization of each of the N polarization-multiplexed reception signals, and phase conjugations of the convoluted real component and imaginary component of each polarization of each of the N polarization-multiplexed reception signals, for each polarization of each of the N polarization-multiplexed reception signals; an equalization step of performing, for each polarization of each of the N polarization-multiplexed reception signals, processing for generating a first addition signal obtained by multiplying each of the real component and the imaginary component of each polarization included in the input signals of the polarization by a complex impulse response, thereafter adding together the multiplied real component and imaginary component, and further applying a phase rotation for frequency offset compensation to the added components, and performing, for each polarization of each of the N polarization-multiplexed reception signals, processing for generating a second addition signal obtained by multiplying each of the phase conjugation of the real component and the phase conjugation of the imaginary component of each polarization included in the input signals of the polarization by a complex impulse response, thereafter adding together the multiplied phase conjugations, and further applying a phase rotation opposite to the phase conjugation for frequency offset compensation to the added phase conjugations; and a second compensation step of adding or subtracting, for each polarization of each of the N polarization-multiplexed reception signals, a transmission data bias correction signal to or from a signal obtained by adding together the first addition signal and the second addition signal that are generated for the polarization.

One aspect of the present invention is the above-described signal processing method, wherein the complex impulse response is dynamically updated, and in the fourth step, the transmission data bias correction signal is adaptively added or subtracted.

One aspect of the present invention is a signal processing device including: a first compensation unit for convoluting each of a real component and an imaginary component of each polarization of a polarization-multiplexed reception signal with an impulse response for compensating for frequency characteristics of a receiver and a complex impulse response for wavelength dispersion compensation; an input signal generation unit for generating, as input signals, the convoluted real component and imaginary component of each polarization, and phase conjugations of the convoluted real component and imaginary component of each polarization, for each polarization; an equalization unit for generating, for each polarization, a first addition signal obtained by multiplying each of the real component and the imaginary component of each polarization included in the input signals by a complex impulse response, thereafter adding together the multiplied real component and imaginary component, and further applying a phase rotation for frequency offset compensation to the added components, and a second addition signal obtained by multiplying each of the phase conjugation of the real component of and the phase conjugation of the imaginary component of each polarization included in the input signals by a complex impulse response, thereafter adding together the multiplied phase conjugations, and further applying a phase rotation opposite to the phase rotation for frequency offset compensation to the added phase conjugations; and a second compensation unit for adding or subtracting a transmission data bias correction signal to or from a signal obtained by adding together the first addition signal and the second addition signal, for each polarization.

One aspect of the present invention is a signal processing device including: a first compensation unit for convoluting each of a real component and an imaginary component of each polarization included in N (N is an integer of 2 or more) polarization-multiplexed reception signals that are spatially multiplexed with an impulse response for compensating for frequency characteristics of a receiver and a complex impulse response for wavelength dispersion compensation; an input signal generation unit for generating, as input signals, the convoluted real component and imaginary component of each polarization of each of the N polarization-multiplexed reception signals, and phase conjugations of the convoluted real component and imaginary component of each polarization of each of the N polarization-multiplexed reception signals, for each polarization of each of the N polarization-multiplexed reception signals; an equalization unit for performing, for each polarization of each of the N polarization-multiplexed reception signals, processing for generating a first addition signal obtained by multiplying each of the real component and the imaginary component of each polarization included in the input signals of the polarization by a complex impulse response, thereafter adding together the multiplied real component and imaginary component, and further applying a phase rotation for frequency offset compensation to the added components, and performing, for each polarization of each of the N polarization-multiplexed reception signals, processing for generating a second addition signal obtained by multiplying each of the phase conjugation of the real component and the phase conjugation of the imaginary component of each polarization included in the input signals of the polarization by a complex impulse response, thereafter adding together the multiplied phase conjugations, and further applying a phase rotation opposite to the phase conjugation for frequency offset compensation to the added phase conjugations; and a second compensation unit for adding or subtracting, for each polarization of each of the N polarization-multiplexed reception signals, a transmission data bias correction signal to or from a signal obtained by adding together the first addition signal and the second addition signal that are generated for the polarization.

One aspect of the present invention is a communication system that includes a transmitter and a receiver having any of the above-described signal processing devices.

Effects of the Invention

The present invention makes it possible to increase the processing speed of equalization processing for accurately performing distortion compensation.

DESCRIPTION OF EMBODIMENTS

Hereinafter, embodiments of the present invention will be described in detail with reference to the drawings.

Figure 1:
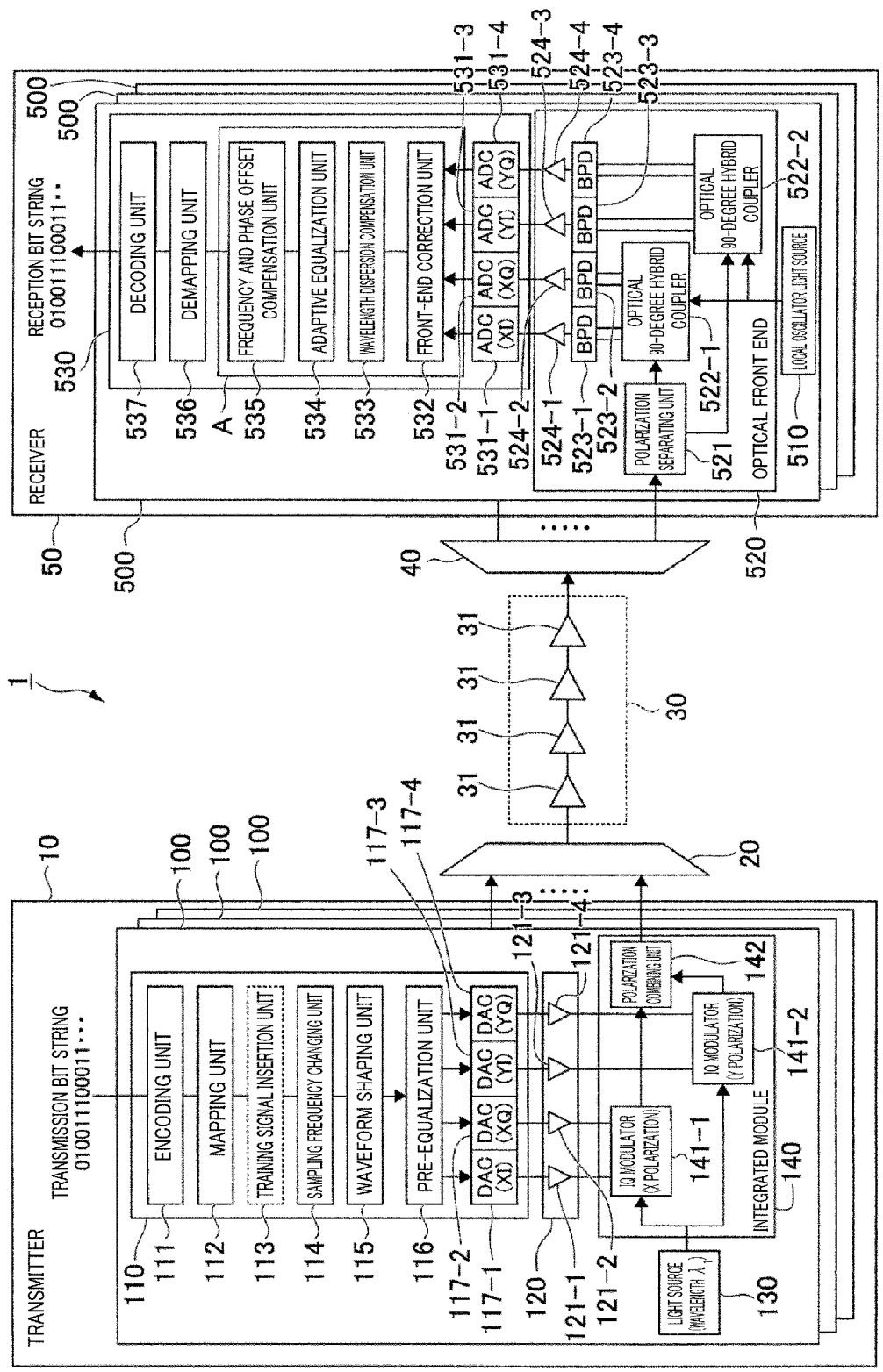
FIG. 1 is a diagram showing a configuration of a digital coherent optical transmission system according to a first embodiment of the present invention.

Firstly, the first embodiment of the present invention will be described. FIG. 1 is a diagram showing a configuration of a digital coherent optical transmission system 1 according to the first embodiment. The digital coherent optical transmission system 1 has a transmitter 10 and a receiver 50. The receiver 50 receives polarization-multiplexed signals from the transmitter 10.

The transmitter 10 has one or more transmission units. In the present embodiment, the transmitter 10 has the same number of transmission units 100 as the number of WDM channels. The transmitters 100 output optical signals with different wavelengths. A WDM multiplexer 20 multiplexes the optical signals output by the transmission units 100 and outputs the multiplexed signal to an optical fiber transmission path 30. Any number of optical amplifiers 31 are provided in the optical fiber transmission path 30. Each of the optical amplifiers 31 receives input of the optical signal from the transmitter 10 side of the optical fiber transmission path 30, amplifies the input optical signal, and outputs the amplified optical signal to the receiver 50 side of the optical fiber transmission path 30. A WDM demultiplexer 40 demultiplexes, by wavelength, the optical signal that has been transmitted through the optical fiber transmission path 30. The receiver 50 has one or more receiving units 500. In the present embodiment, the receiver 50 has the same number of receiving units 500 as the number of WDM channels. The receiving units 500 receive the optical signals demultiplexed by the WDM demultiplexer 40. The optical signals received by the receiving units 500 have different wavelengths.

Each of the transmission units 100 includes a digital signal processing unit 110, a modulator driver 120, a light source 130, and an integrated module 140. The digital signal processing unit 110 includes an encoding unit 111, a mapping unit 112, a training signal insertion unit 113, a sampling frequency changing unit 114, a waveform shaping unit 115, a pre-equalization unit 116, and digital-to-analog converters (DACs) 117-1 to 117-4.

The encoding unit 111 outputs a transmission signal obtained by performing FEC (forward error correction) encoding on a transmission bit string. The mapping unit 112 maps the transmission signal output from the encoding unit 111 onto a symbol. The training signal insertion unit 113 inserts a known training signal into the transmission signal that has been subjected to symbol mapping by the mapping unit 112. The sampling frequency changing unit 114 performs up-sampling by changing the sampling frequency for the transmission signal into which the training signal has been inserted. The waveform shaping unit 115 limits the band of the sampled transmission signal.

The pre-equalization unit 116 compensates for distortion of the waveform of the transmission signal that has been band-limited by the waveform shaping unit 115, and outputs the compensated signal to the DACs 117-1 to 117-4. The DAC 117-1 converts an I (in-phase) component of X-polarization of the transmission signal input from the pre-equalization unit 116 from a digital signal to an analog signal, and outputs the converted signal to the modulator driver 120. The DAC 117-2 converts a Q (orthogonal) component of the X-polarization of the transmission signal input from the pre-equalization unit 116 from a digital signal to an analog signal, and outputs the converted signal to the modulator driver 120. The DAC 117-3 converts an I component of Y-polarization of the transmission signal input from the pre-equalization unit 116 from a digital signal to an analog signal, and outputs the converted signal to the modulator driver 120. The DAC 117-4 converts a Q component of Y-polarization of the transmission signal input from the pre-equalization unit 116 from a digital signal to an analog signal, and outputs the converted signal to the modulator driver 120.

The modulator driver 120 has amplifiers 121-1 to 121-4. The amplifier 121-$i$ ($i$ is an integer of 1 to 4) amplifies the analog signal output from the DAC 117-$i$, and drives a modulator of the integrated module 140 using the amplified analog signal. The light source 130 is, for example, an LD (semiconductor laser). The light source 130 included in a jth transmission unit 100 outputs light with a wavelength $\lambda j$ ($j$ is an integer of 1 to the number of WDM channels).

The integrated module 140 includes IQ modulators 141-1 and 141-2, and a polarization combining unit 142. The IQ modulator 141-1 outputs an X-polarization optical signal generated by modulating the optical signal output by the light source 130 using the I component of the X-polarization output from the amplifier 121-1 and the Q component of the X-polarization output from the amplifier 121-2. The IQ modulator 141-2 outputs a Y-polarization optical signal generated by modulating the optical signal output by the light source 130 using the I component of the Y-polarization output from the amplifier 121-3 and the Q component of the Y-polarization output from the amplifier 121-4. The polarization combining unit 142 polarization-combines the X-polarization optical signal output by the IQ modulator 141-1 and the Y-polarization optical signal output by the IQ modulator 141-2, and outputs the polarization-combined signal to the WDM multiplexer 20.

Each of the receiving units 500 includes a local oscillator light source 510, an optical front end 520, and a digital signal processing unit 530. The local oscillator light source 510 is, for example, an LD. The local oscillator light source 510 outputs local oscillator (LO).

The optical front end 520 converts an optical signal to an electrical signal while maintaining the phase and amplitude of a polarization-multiplexed phase-modulated signal. The optical front end 520 includes a polarization separating unit 521, optical 90-degree hybrid couplers 522-1 and 522-2, BPDs (Balanced Photo Diodes) 523-1 to 523-4, and amplifiers 524-1 to 524-4.

The polarization separating unit 521 separates an input optical signal into X-polarization and Y-polarization. The polarization separating unit 521 outputs the X polarization optical signal to the optical 90-degree hybrid coupler 522-1, and outputs the Y-polarization optical signal to the optical 90-degree hybrid coupler 522-2. The optical 90-degree hybrid coupler 522-1 causes the X-polarization optical signal and the local oscillator output from the local oscillator light source 510 to interfere with each other, and extracts the I component and the Q component of a received optical electric field. The optical 90-degree hybrid coupler 522-1 outputs the extracted I component and Q component of the X-polarization to the BPDs 523-1 and 523-2. The optical 90-degree hybrid coupler 522-2 causes the Y-polarization optical signal and the local oscillator output from the local oscillator light source 510 to interfere with each other, and extracts the I component and the Q component of the received optical electrical field. The optical 90-degree hybrid coupler 522-2 outputs the extracted I component and Q component of the Y-polarization to the BPD 523-3 and the BPD 523-4.

The BPDs 523-1 to 523-4 are photoelectric converters of differential input type. The BPD 523-$i$ outputs, to the amplifier 524-$i$, a difference value between photocurrents generated in two photodiodes with the same characteristics. The BPD 523-1 converts the I component of the X-polarization reception signal to an electrical signal, and outputs the electrical signal to the amplifier 524-1. The BPD 523-2 converts the Q component of the X-polarization reception signal to an electrical signal, and outputs the electrical signal to the amplifier 524-2. The BPD 523-3 converts the I component of the Y-polarization reception signal to an electrical signal, and outputs the electrical signal to the amplifier 524-3. The BPD 523-4 converts the Q component of the Y-polarization reception signal to an electrical signal, and outputs the electrical signal to the amplifier 524-4. The amplifier 524-$i$ (i is an integer of 1 to 4) amplifies the electrical signal output from the BPD 523-$i$, and outputs the amplified electrical signal to the digital signal processing unit 530.

The digital signal processing unit 530 includes an analog-to-digital converters (ADCs) 531-1 to 531-4, a front-end correction unit 532, a wavelength dispersion compensation unit 533, an adaptive equalization unit 534, a frequency and phase offset compensation unit 535, a demapping unit 536, and a decoding unit 537. The ADC 531-$i$ (i is an integer of 1 to 4) converts the electrical signal output from the amplifier 524-$i$ from an analog signal to a digital signal, and outputs the digital signal to the front-end correction unit 532.

The front-end correction unit 532 receives input of the I component of the X-polarization reception signal from the ADC 531-1, the Q component of the X-polarization reception signal from the ADC 531-2, the I component of the Y-polarization reception signal from the ADC 531-3, and the Q component of the Y-polarization reception signal from the ADC 531-4. The front-end correction unit 532 generates, using the input signals, a reception signal that has been compensated for frequency characteristics in the optical front end 520, and outputs the generated reception signal to the wavelength dispersion compensation unit 533.

The wavelength dispersion compensation unit 533 estimates wavelength dispersion received in the optical fiber transmission path 30, compensates for the estimated wavelength dispersion for the electrical signal output from the front-end correction unit 532, and outputs the compensated electrical signal to the adaptive equalization unit 534. The adaptive equalization unit 534 adaptively performs equalization processing on the reception signal output from the wavelength dispersion compensation unit 533. The frequency and phase offset compensation unit 535 performs processing such as compensation for frequency offset and phase noise on the reception signal that has been subjected to the equalization processing by the adaptive equalization unit 534.

The demapping unit 536 determines the symbol of the reception signal output by the frequency and phase offset compensation unit 535, and converts the determined symbol to binary data. The decoding unit 537 performs error correction decoding processing such as FEC on the binary data that has been demapped by the demapping unit 536, and obtains a reception bit string.

Although the above embodiment describes an example of one optical fiber transmission path, the same applies to a spatially multiplexed transmission system (e.g. multi-core fiber, multi-mode fiber, and free-space transmission).

A description will be given below of principles of an equalization processing method applied to a demodulation digital signal processing unit A that includes the front-end correction unit 532, the wavelength dispersion compensation unit 533, the adaptive equalization unit 534, and the frequency and phase offset compensation unit 535.

An X-polarization component of an ideal polarization-multiplexed optical signal to be transmitted is denoted as a complex signal $S_{X0}$, and a Y-polarization component is denoted as a complex signal $S_{Y0}$. A complex signal $S_{X1}$ of the X-polarization component and a complex signal $S_{Y1}$ of the Y-polarization component, which are transmitter outputs for which consideration is given to IQ imbalance due to variations in the modulator driver 120 of the transmitter 10, inter-lane skew, and frequency characteristics, can be written as the following formula (1) using four complex impulse responses $h_{Tx}$, $g_{Tx}$, $h_{Ty}$, and $g_{Ty}$, and bias shift terms $C_X$ and $C_Y$ (Widely linear representation). Note that the right superscript "*" denotes a phase conjugation.

$$\begin{pmatrix} S_{X1} \\ S_{X1}^* \\ S_{Y1} \\ S_{Y1}^* \end{pmatrix} = \begin{pmatrix} C_X \\ C_X^* \\ C_Y \\ C_Y^* \end{pmatrix} + \begin{pmatrix} h_{Tx} & g_{Tx} & 0 & 0 \\ g_{Tx}^* & h_{Tx}^* & 0 & 0 \\ 0 & 0 & h_{Ty} & g_{Ty} \\ 0 & 0 & g_{Ty}^* & h_{Ty}^* \end{pmatrix} \begin{pmatrix} S_{X0} \\ S_{X0}^* \\ S_{Y0} \\ S_{Y0}^* \end{pmatrix} \quad (1)$$

The complex signal $S_{X1}$ of the X-polarization component and the complex signal $S_{Y1}$ of the Y-polarization component are subjected to wavelength dispersion and polarization rotation, polarization mode dispersion, and polarization-dependent loss while being transmitted through the optical fiber transmission line 30. If the wavelength dispersion is denoted as a complex impulse response $h_{CD}$, and the influences of polarization rotation and polarization mode dispersion are denoted as $h_{xx}$, $h_{yx}$, $h_{yy}$, and $h_{xy}$, an optical signal $S_{X2}$ of the X-polarization component and an optical signal $S_{Y2}$ of the Y-polarization component after the optical fiber transmission can be expressed by the following formula (2).

$$\begin{pmatrix} S_{X2} \\ S_{X2}^* \\ S_{Y2} \\ S_{Y2}^* \end{pmatrix} = \begin{pmatrix} h_{CD} & 0 & 0 & 0 \\ 0 & h_{CD}^* & 0 & 0 \\ 0 & 0 & h_{CD} & 0 \\ 0 & 0 & 0 & h_{CD}^* \end{pmatrix} \begin{pmatrix} h_{xx} & 0 & h_{yx} & 0 \\ 0 & h_{xx}^* & 0 & h_{yx}^* \\ h_{xy} & 0 & h_{yy} & 0 \\ 0 & h_{xy}^* & 0 & h_{yy}^* \end{pmatrix} \begin{pmatrix} S_{X1} \\ S_{X1}^* \\ S_{Y1} \\ S_{Y1}^* \end{pmatrix} \quad (2)$$

If frequency offsets $\omega_x$ and $\omega_y$ exist between a laser beam output by the light source 130 of the transmitter 10 and local oscillator output by the local oscillator light source 510 of the receiver 50, a signal $S_{X3}$ of the X-polarization component and a signal $S_{Y3}$ of the Y-polarization component after the light/electricity conversion can be expressed by the following formula (3).

$$\begin{pmatrix} S_{X3} \\ S_{X3}^* \\ S_{Y3} \\ S_{Y3}^* \end{pmatrix} = \begin{pmatrix} \exp(j\omega_x t) & 0 & 0 & 0 \\ 0 & \exp(-j\omega_x t) & 0 & 0 \\ 0 & 0 & \exp(j\omega_y t) & 0 \\ 0 & 0 & 0 & \exp(-j\omega_y t) \end{pmatrix} \begin{pmatrix} S_{X2} \\ S_{X2}^* \\ S_{Y2} \\ S_{Y2}^* \end{pmatrix} \quad (3)$$

Furthermore, a reception complex signal $S_{X4}$ of the X-polarization component and a reception complex signal $S_{Y4}$ of the Y-polarization component for which consideration is given to light/electricity conversion at the BPDs 523-1 to 523-4, as well as frequency characteristics, IQ imbalance, skew, or the like at the reception front end, such as the ADCs 531-1 to 531-4, can be expressed by the formula (4) using four complex impulse responses $h_{Rx}$, $g_{Rx}$, $h_{Ry}$, and $g_{Ry}$.

$$\begin{pmatrix} S_{X4} \\ S_{X4}^* \\ S_{Y4} \\ S_{Y4}^* \end{pmatrix} = \begin{pmatrix} h_{Rx} & g_{Rx} & 0 & 0 \\ g_{Rx}^* & h_{Rx}^* & 0 & 0 \\ 0 & 0 & h_{Ry} & g_{Ry} \\ 0 & 0 & g_{Ry}^* & h_{Ry}^* \end{pmatrix} \begin{pmatrix} S_{X3} \\ S_{X3}^* \\ S_{Y3} \\ S_{Y3}^* \end{pmatrix} \quad (4)$$

Accordingly, if an appropriate 4×4 matrix W and constant terms $C_{biasX}$ and $C_{biasY}$ are defined, the reception complex signal $S_{X4}$ of the X-polarization component and the reception complex signal $S_{Y4}$ of the Y-polarization component can be expressed by the formula (5).

$$\begin{pmatrix} S_{X4} \\ S_{X4}^* \\ S_{Y4} \\ S_{Y4}^* \end{pmatrix} = \begin{pmatrix} \exp(j\omega_x n) & \exp(-j\omega_x n) & 0 & 0 \\ \exp(-j\omega_x n) & \exp(j\omega_x n) & 0 & 0 \\ 0 & 0 & \exp(j\omega_y n) & \exp(-j\omega_y n) \\ 0 & 0 & \exp(-j\omega_y n) & \exp(j\omega_y n) \end{pmatrix} \quad (5)$$

$$\overbrace{\begin{pmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{pmatrix}}^{W} \begin{pmatrix} S_{X0} \\ S_{X0}^* \\ S_{Y0} \\ S_{Y0}^* \end{pmatrix} + \begin{pmatrix} C_{biasX} \\ C_{biasX}^* \\ C_{biasY} \\ C_{biasY}^* \end{pmatrix}$$

Based on the formulas (1) to (5), the reception complex signal $S_{X4}$ of the X-polarization component in the receiver 50 is expressed by the formula (6), and the reception complex signal $S_{Y4}$ of the Y-polarization component in the receiver 50 is expressed by the formula (7).

$$\begin{aligned}
S_{X4} = &\exp(j\omega_x n)\cdot(h_{Rx}*h_{CD}*h_{xx}*h_{Tx}*S_{X0}) + \exp(j\omega_x n)\cdot \\
&(h_{Rx}*h_{CD}*h_{xx}*g_{Tx}*S_{X0}^*) + \exp(j\omega_x n)\cdot \\
&(h_{Rx}*h_{CD}*h_{yx}*h_{Ty}*S_{Y0}) + \exp(j\omega_x n)\cdot \\
&(h_{Rx}*h_{CD}*h_{yx}*g_{Ty}*S_{Y0}^*) + \exp(-j\omega_x n)\cdot \\
&(g_{Rx}*h_{CD}h_{xx}h_{Tx}**S_{X0}^*) + \exp(-j\omega_x n)\cdot \\
&(g_{Rx}*h_{CD}h_{xx}g_{Tx}**S_{X0}) + \exp(-j\omega_x n)\cdot \\
&(g_{Rx}*h_{CD}h_{yx}h_{Tx}**S_{Y0}^*) + \exp(-j\omega_x n)\cdot \\
&(g_{Rx}*h_{CD}h_{yx}g_{Tx}**S_{Y0}) + C_{biasX}
\end{aligned} \quad (6)$$

$$\begin{aligned}
S_{Y4} = &\exp(j\omega_y n)\cdot(h_{Ry}*h_{CD}*h_{xy}*h_{Tx}*S_{X0}) + \exp(j\omega_y n)\cdot \\
&(h_{Ry}*h_{CD}*h_{xy}*g_{Tx}*S_{X0}^*) + \exp(j\omega_y n)\cdot \\
&(h_{Ry}*h_{CD}*h_{yy}*h_{Ty}*S_{Y0}) + \exp(j\omega_y n)\cdot \\
&(h_{Ry}*h_{CD}*h_{yy}*g_{Ty}*S_{Y0}^*) + \exp(-j\omega_y n)\cdot \\
&(g_{Ry}*h_{CD}h_{xy}h_{Tx}**S_{X0}^*) + \exp(-j\omega_y n)\cdot \\
&(g_{Ry}*h_{CD}h_{xy}g_{Tx}**S_{X0}) + \exp(-j\omega_y n)\cdot \\
&(g_{Ry}*h_{CD}h_{yy}h_{Tx}**S_{Y0}^*) + \exp(-j\omega_y n)\cdot \\
&(g_{Ry}*h_{CD}h_{yy}g_{Tx}**S_{Y0}) + C_{biasX}
\end{aligned} \quad (7)$$

The digital signal processing unit 530 of an actual coherent receiver receives real components and imaginary components of the reception complex signals $S_{X4}$ and $S_{Y4}$. When further deformation is given, the formulas (8) and (9) are obtained.

$$\begin{aligned}
S_{X0} = &\exp(j\omega_x n)\{h_1 h_{CD}^{-1} \mathcal{R}[S_{X4}] + h_5 h_{CD}^{-1} \mathfrak{S}[S_{X4}] + \\
&h_9 h_{CD}^{-1} \mathcal{R}[S_{Y4}] + h_{13} h_{CD}^{-1} \mathfrak{S}[S_{Y4}]\} + \exp(-j\omega_x n) \\
&\{h_2 h_{CD}^{*-1} \mathcal{R}[S_{X4}] + h_6 h_{CD}^{*-1} \mathfrak{S}[S_{X4}] + h_{10} h_{CD}^{*-1} \\
&\mathcal{R}[S_{Y4}]\} + h_{14} h_{CD}^{*-1} \mathfrak{S}[S_{Y4}] + C_{biasX}
\end{aligned} \quad (8)$$

$$\begin{aligned}
S_{Y0} = &\exp(j\omega_y n)\{h_3 h_{CD}^{-1} \mathcal{R}[S_{X4}] + h_7 h_{CD}^{-1} \mathfrak{S}[S_{X4}] + \\
&h_{11} h_{CD}^{-1} \mathcal{R}[S_{Y4}]\} + h_{15} h_{CD}^{-1} \mathfrak{S}[S_{Y4}]\} + \exp(- \\
&j\omega_y n)\{h_4 h_{CD}^{*-1} \mathcal{R}[S_{X4}] + h_8 h_{CD}^{*-1} \mathfrak{S}[S_{X4}] + \\
&h_{12} h_{CD}^{*-1} \mathcal{R}[S_{Y4}]\} + h_{16} h_{CD}^{*-1} \mathfrak{S}[S_{Y4}] + C_{biasY}
\end{aligned} \quad (9)$$

Here, $\mathcal{R}_{[z]}$ denotes the real part of the complex number z, and $\mathfrak{S}[_z]$ denotes the imaginary part of the complex number z.

Note that impulse responses $h_1$ to $h_{16}$ in the formulas (8) and (9) are elements of an inverse matrix of the matrix W.

The demodulation digital signal processing unit A generates a signal obtained by convoluting an I (real) component signal (XI) and a Q (imaginary) component signal (XQ) of the X-polarization component, as well as an I component signal (YI) and a Q component signal (YQ) of the Y-polarization component, which are four real signals output by the coherent receiver (the optical front end 520), with an inverse response $h_{CD}^{-1}$ of a complex impulse response of the wavelength dispersion. The adaptive equalization unit 534 has a total of eight inputs for each of the X-polarization component and the Y-polarization component, namely the I component signal (XI) and Q component signal (XQ) of the X-polarization component and I component signal (YI) and the Q component signal (YQ) of the Y-polarization component that has been subjected to the convolution, and signals obtained by performing phase conjugation (conj) on these signals.

Figure 2:
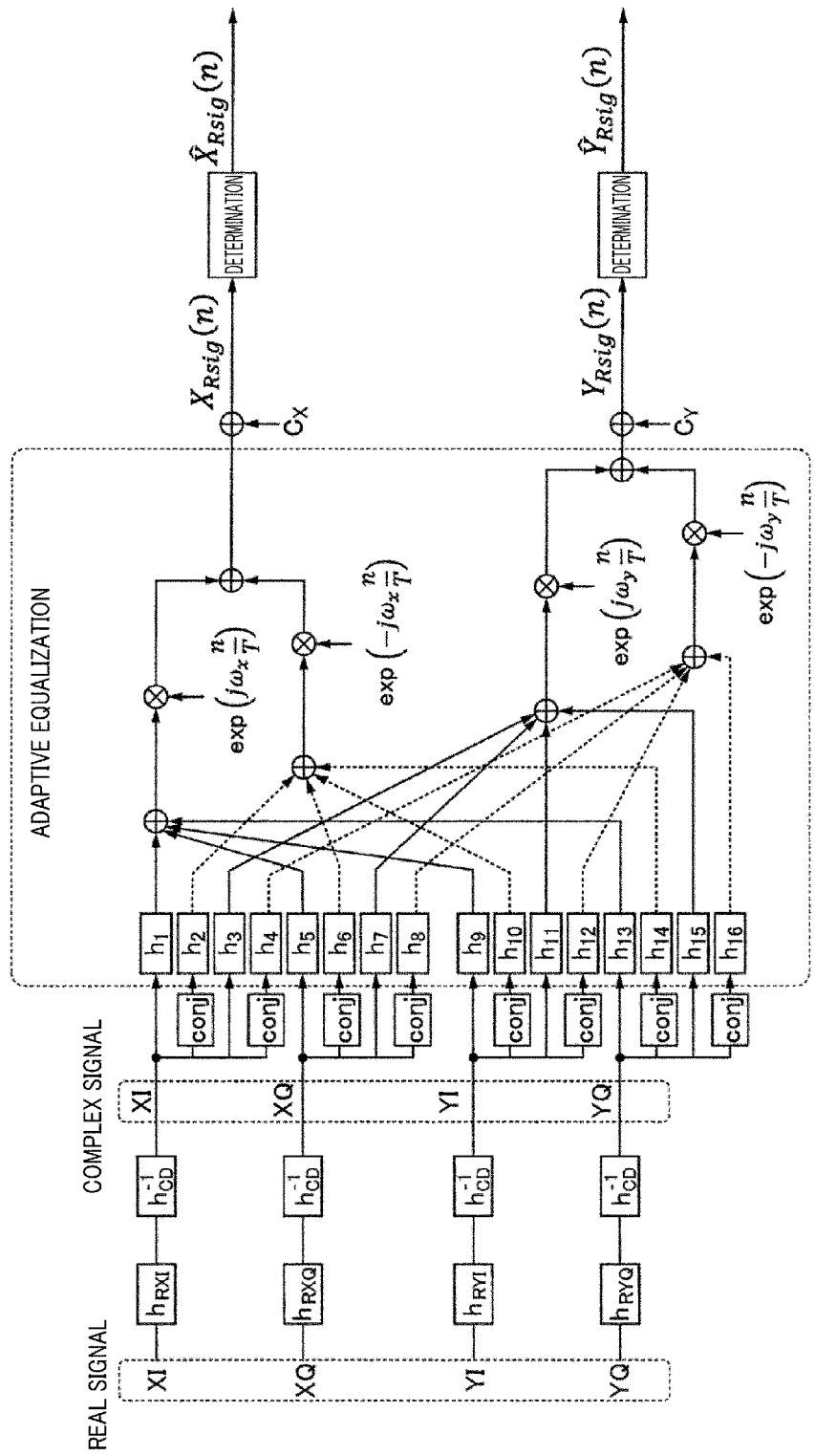
FIG. 2 is a diagram showing a demodulation digital signal processing unit according to the same embodiment.

FIG. 2 is a diagram showing a configuration of the demodulation digital signal processing unit A. The demodulation digital signal processing unit A shown in FIG. 2 operates as a MIMO equalizer. The demodulation digital signal processing unit A demodulates a reception signal based on the formulas (8) and (9).

The demodulation digital signal processing unit A receives input of a real component XI and an imaginary component XQ of the reception complex signal $S_{X4}$ of the X-polarization and a real component YI and an imaginary component YQ of the reception complex signal $S_{Y4}$ of the Y-polarization that have been converted to digital signals by the ADCs 531-1 to 531-4. The demodulation digital signal processing unit A convolutes the real component XI, the imaginary component XQ, the real component YI, and the imaginary component YQ with an impulse response for compensating for frequency characteristics of the receiver 50 and a complex impulse response $h_{CD}^{-1}$ for wavelength dispersion compensation, and applies a phase rotation for frequency offset compensation. As a result, two complex signals are output for each of the X-polarization component and the Y-polarization component. Subsequently, the demodulation digital signal processing unit A generates a phase conjugation of each of the two complex signals, and makes input of eight signals for each of the X-polarization component and the Y-polarization component, namely the real component XI, the imaginary component XQ, the real component YI, the imaginary component YQ, and the phase conjugations of these components. Thus, the adaptive equalizer 524 of the receiver 50 can dynamically compensate for IQ imbalance and IQ inter-lane skew occurring in the transmitter 10, a bias shift in the IQ modulators 141-1 and 141-2, or the like, in addition to impairment occurring in the optical fiber transmission path 30 and the receiver 50, and the quality of the reception signal increases.

Specifically, the demodulation digital signal processing unit A applies an impulse response $h_{RXI}$ for compensating for the frequency characteristics of the receiver 50 and the impulse response $h_{CD}^{-1}$ for wavelength dispersion compensation, to the real component XI of a reception complex signal $R_{X4}$ of the X-polarization component, and applies an impulse response $h_{RXQ}$ for compensating for the frequency characteristics of the receiver 50 and the impulse response $h_{CD}^{-1}$ for wavelength dispersion compensation, to the imaginary component XQ of the reception complex signal $R_{X4}$ of the X-polarization component. Similarly, the demodulation digital signal processing unit A applies an impulse response $h_{RYI}$ for compensating for the frequency characteristics of the receiver 50 and the impulse response $h_{CD}^{-1}$ for wavelength dispersion compensation, to the real component YI of a reception complex signal $R_{Y4}$ of the Y-polarization component, and performs an impulse response $h_{RYQ}$ for compensating for the frequency characteristics of the receiver 50 and the impulse response $h_{CD}^{-1}$ for wavelength dispersion compensation, to the imaginary component YQ of the reception complex signal $R_{Y4}$ of the Y-polarization component. The demodulation digital signal processing unit A splits, into four signals, each of the real component XI, the imaginary component XQ, the real component YI, and the imaginary component YQ that have been convoluted with the impulse response for compensating for the frequency characteristics of the receiver 50 and the impulse response for wavelength dispersion compensation. The demodulation digital signal processing unit A inputs two of the split four signals as-is to the adaptive equalization unit 534, and converts the two remaining signals to phase-conjugated signals and inputs the converted signals to the adaptive equalization unit 534.

The adaptive equalization unit 534 adds together the real component XI convoluted with the impulse response $h_1$, the imaginary component XQ convoluted with the impulse response $h_5$, the real component YI convoluted with the impulse response $h_9$, and the imaginary component YQ convoluted with the impulse response $h_{13}$, and then applies a frequency offset $\exp(j\omega_x(n/T))$ on the added signal. n denotes the symbol interval, and T denotes the period of the symbol. Furthermore, the adaptive equalization unit 534 adds together a real component phase conjugation XI* convoluted with the impulse response $h_2$, an imaginary component phase conjugation XQ* convoluted with the impulse response $h_6$, a real component phase conjugation YI* convoluted with the impulse response $h_{10}$, and an imaginary component phase conjugation YQ* convoluted with the impulse response $h_{14}$, and then applies a frequency offset $\exp(-j\omega_x(n/T))$ on the added signal. The adaptive equalization unit 534 adds together the added signal that has been subjected to the frequency offset $\exp(j\omega_x(n/T))$ and the added signal that has been subjected to the frequency offset $\exp(-j\omega_x(n/T))$, and obtains a reception signal of the X-polarization component. The adaptive equalization unit 534 adds (or subtracts) a transmission data bias correction signal $C_X$ for canceling a bias shift of the X-polarization component to (from) the obtained reception signal of the X-polarization component, and obtains a distortion-corrected reception signal $X_{Rsig}(n)$ of the X-polarization component. The demapping unit 536 outputs a reception signal $X^{\wedge}_{Rsig}(n)$ obtained as a result of performing symbol determination on the reception signal $X_{Rsig}(n)$.

Meanwhile, the adaptive equalization unit 534 adds together the real component XI convoluted with the impulse response $h_3$, the imaginary component XQ convoluted with the impulse response $h_7$, the real component YI convoluted with the impulse response $h_{11}$, and the imaginary component YQ convoluted with the impulse response $h_{15}$, and then applies a frequency offset $\exp(j\omega_y(n/T))$ on the added signal. Furthermore, the adaptive equalization unit 534 adds together the real component phase conjugation XI* convoluted with the impulse response $h_4$, the imaginary component phase conjugation XQ* convoluted with the impulse response $h_8$, the real component phase conjugation YI* convoluted with the impulse response $h_{12}$, the imaginary component phase conjugation YQ* convoluted with the impulse response $h_{14}$, and then applies a frequency offset $\exp(-j\omega_y(n/T))$ on the added signal. The adaptive equalization unit 534 adds together the added signal that has been subjected to the frequency offset $\exp(j\omega_y(n/T))$ and the added signal that has been subjected to the frequency offset $\exp(-j\omega_y(n/T))$, and obtains a reception signal of the Y-polarization component. The adaptive equalization unit 534 adds (or subtracts) a transmission data bias correction signal $C_Y$ for canceling a bias shift of the Y-polarization component to (from) the obtained reception signal of the Y-polarization component, and obtains a distortion-corrected reception signal $Y_{Rsig}(n)$ of the X-polarization component. The demapping unit 536 outputs a reception signal $Y^{\wedge}_{Rsig}(n)$ obtained as a result of performing symbol determination on the reception signal $Y_{Rsig}(n)$.

Note that the complex impulse response $h_{CD}^{-1}$ for wavelength dispersion compensation, the impulse responses $h_1$ to $h_{16}$, and the frequency offsets $\exp(j\omega_{xn}/T)$ $\exp(-j\omega_{xn}/T)$, $\exp(j\omega_{yn}/T)$, and $\exp(-j\omega_{yn}/T)$ are changed adaptively and dynamically. The receiver 50 acquires these values by any method.

Note that the convolution with the impulse responses $h_{RXI}$, $h_{RXQ}$, $h_{RYI}$, and $h_{RYQ}$ corresponds to processing performed by the front-end correction unit 532 shown in FIG. 1, and the convolution with the impulse response $h_{CD}^{-1}$ for wavelength dispersion compensation corresponds to processing performed by the wavelength dispersion compensation unit 533. The addition (or subtraction) of the transmission data bias correction signals $C_X$ and $C_Y$ corresponds to a function of the frequency and phase offset compensation unit 535.

Figure 3:
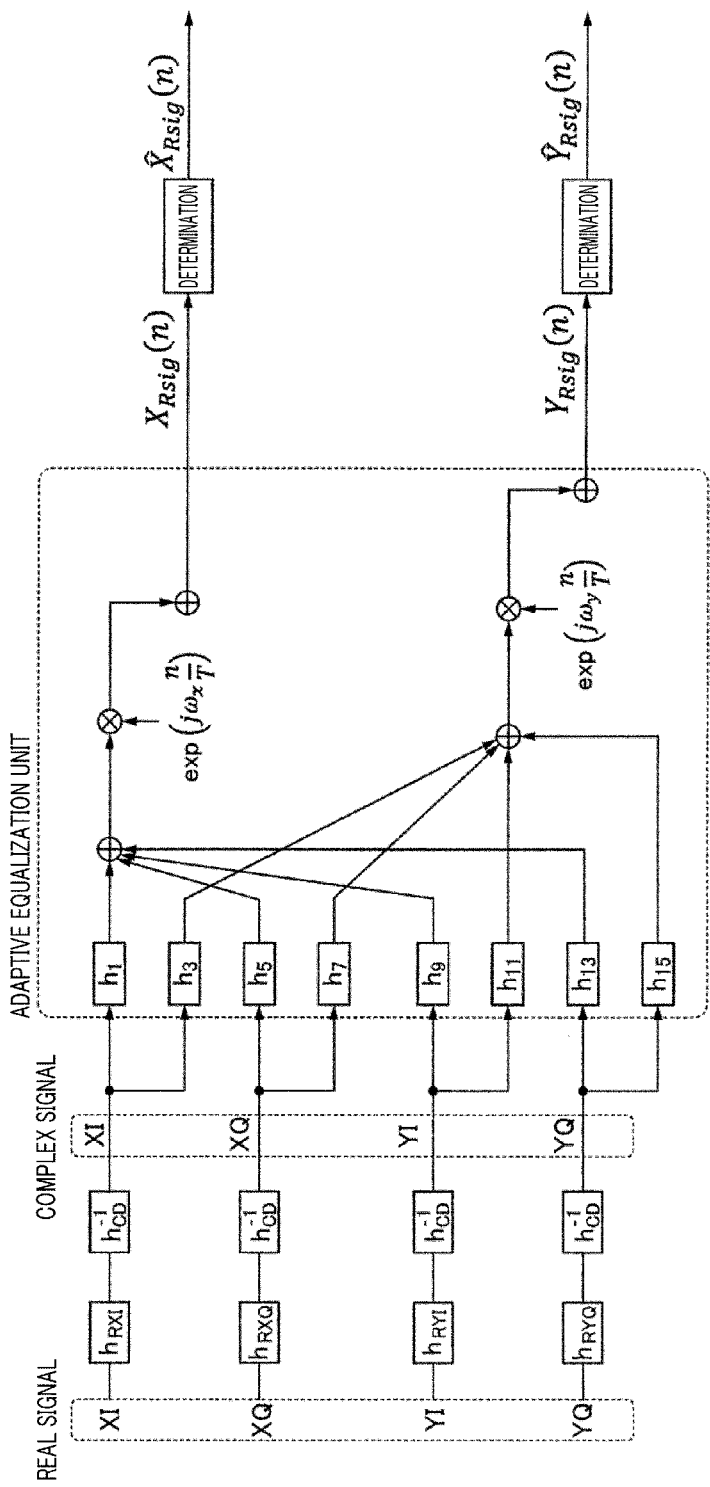
FIG. 3 is a diagram showing a demodulation digital signal processing unit to which a conventional technique is applied.

FIG. 3 is a diagram showing a configuration of a demodulation digital signal processing unit that uses the conventional technique. The configuration shown in FIG. 3 also enables compensation for IQ imbalance and skew that occur in the receiver. However, in a complex number 4×2 MIMO equalizer, if a wavelength offset and a phase offset exist in a light source between the transmitter and the receiver, waveform distortion that occurs in the transmitter cannot be compensated for. In other words, the dimensions of the input signal (the number of simultaneous equations) are insufficient with respect to the type of tap (h) required for compensation (the number of unknowns).

Specifically, the reception complex signal $S_{x4}$ of the X-polarization can be expressed by convoluting the complex signals $S_{x0}$ and $S_{y0}$ and the conjugations $S_{x0}^*$ and $S_{y0}^*$ thereof with different complex impulse responses, and adding together eight independent complex terms multiplied by the frequency offset $\exp(j\omega_x n)$ or $\exp(-j\omega_x n)$ and the bias term $C_{biasX}$, as indicated by the formula (6). Similarly, the reception complex signal $S_{Y4}$ of the Y-polarization can be expressed by convoluting the complex signals $S_{X0}$ and $S_{Y0}$ and the conjugations $S_{X0}^*$ and $S_{Y0}^*$ thereof with different complex impulse responses, and adding together eight independent complex terms multiplied by the frequency offset $\exp(j\omega_y n)$ or $\exp(-j\omega_y n)$ and the bias term $C_{biasY}$, as indicated by the formula (7). Therefore, the polarization-multiplexed signal received after fiber propagation can be expressed with the 16 independent complex terms $w_{11}$ to $w_{44}$ and the two bias terms $C_{biasX}$ and $C_{biasY}$, as in the matrix expression (5). Accordingly, the complex signals $S_{x0}$ and $S_{Y0}$ can be expressed by multiplying the reception complex signals $S_{x4}$ and $S_{Y4}$ and the conjugations $S_{x0}^*$ and $S_{Y0}^*$ thereof by positive and negative frequency offsets and convoluting the resulting signals with the 16 appropriate different impulse responses $h_1$ to $h_{16}$. As mentioned above, the impulse responses $h_1$ to $h_{16}$ are elements of the inverse matrix of the matrix W.

However, since the configuration to which a conventional technique such as that shown in FIG. 3 is applied uses a model in which only the frequency offset $\exp(j\omega_x n)$ is considered in the formula (5), the transmission signal is expressed by only multiplying by one of the frequency offsets and only using $\exp(j\omega_x n)S_{x4}$ and $\exp(j\omega_x n)S_{Y4}$ and their conjugations $\exp(-j\omega_x n)S_{x4}*$ and $\exp(-j\omega_x n)S_{Y4}*$ terms. Accordingly, IQ imbalance and skew of the receiver that are expressed with $h_{rx}$ and $g_{rx}$ can be corrected, but distortion in the transmitter cannot be corrected.

Figure 4:
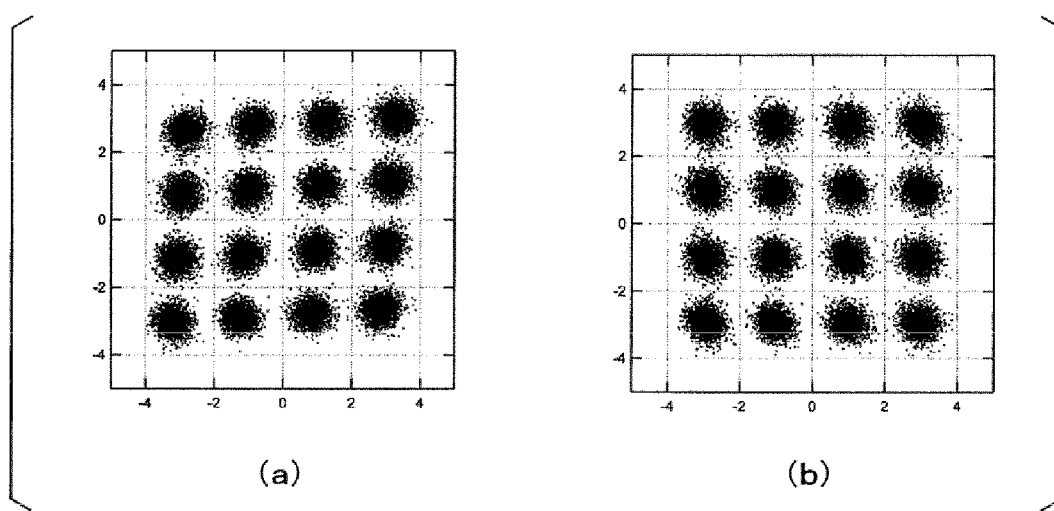
FIG. 4 shows diagrams showing experimental results of the conventional technique and the embodiment.

FIG. 4 shows diagrams showing experimental results related to the quality of adaptive equalization processing. FIG. 4(a) shows a constellation of the reception signal in the receiver that uses the conventional technique, and FIG. 4(b) shows a constellation of the reception signal in the receiver 50 in the present embodiment. The reception signal is a polarization-multiplexed 16QAM (Quadrature Amplitude Modulation) signal that transmitted by 80 km through a single-mode fiber (SMF) with wavelength dispersion of 1360 ps/nm. The frequency offset was 160 [MHz]. As for skew in the receiver, XI-XQ was 10 [ps] and YI-YQ was 25 [ps].

As shown in FIG. 4(a), with the receiver that uses the conventional technique, rhomboid distortion remains due to the influence of a shift in the modulator bias. The BER (Bit Error Rate) was $7.4 \times 10^{-4}$. On the other hand, as shown in FIG. 4(b), a signal that is square and has no distortion was obtained with the receiver 50 in the present embodiment. The BER was $1.3 \times 10^{-4}$, which was lower than that of the receiver that uses the conventional technique.

From the above experimental results, it can be understood that the present embodiment makes possible to remove the influence (rhomboid distortion) of a shift in the modulator bias that could not removed with the conventional technique and obtain a signal that is square and has no distortion.

Subsequently, the second embodiment of the present invention will be described. Although not shown in the diagrams, the second embodiment will describe the case where N polarization-multiplexed signals are spatially multiplexed (N?2). The basic system configuration of the digital coherent optical transmission system in the present embodiment is the same as that of the digital coherent optical transmission system 1 in the first embodiment shown in FIG. 1. The digital coherent optical transmission system in the present embodiment differs from the digital coherent optical transmission system 1 shown in FIG. 1 on the following three points. The first point is that the transmitter 10 transmits N polarization-multiplexed signals that are spatially multiplexed. The second point is that a device for spatial multiplexing and demultiplexing, such as a mode multiplexer/demultiplexer, is inserted in addition to the WDM multiplexer 20 and the WDM demultiplexer 40. The third point is that, in the receiver 50, the number of optical front ends 520 arranged corresponds to the number of spatial multiplexing channels, the number of inputs of the MIMO equalizer (the demodulation digital signal processing unit A) and complex impulse responses increases to $16N^2$, and N sets of polarization-multiplexed signals are demodulated.

The N polarization-multiplexed signals that are spatially multiplexed are transmitted to the receiver 50 by a multi-core fiber, a multi-mode fiber, or the like, for example. In spatially-multiplexed transmission with the number of modes being N, a state of the transmission path including the transmitter and the receiver can be written using a 4N×4N matrix, similarly to the above formula (5). Accordingly, if the number of complex impulse responses at the MIMO equalizer of the receiver is $16N^2$, distortion that occurs in the transmitter can also be compensated for through digital signal processing performed in the receiver even in the case of spatially-multiplexed transmission.

Specifically, the demodulation digital signal processing unit A operates as follows. The I component signal and the Q component signal of the X-polarization component of an ith (i is an integer of 1 to N) polarization-multiplexed reception signal output by the optical front end 520 are denoted as a real component $XI_i$ and an imaginary component $XQ_i$, respectively, and the I component signal and the Q component signal of the Y-polarization component are denoted as a real component $YI_i$ and an imaginary component $YQ_i$, respectively. The demodulation digital signal processing unit A convolutes each of the real component $XI_i$, the imaginary component $XQ_i$, the real component $YI_i$, and the imaginary component $YQ_i$ of the ith polarization-multiplexed reception signal with an impulse response for compensating for frequency characteristics of the receiver and a complex impulse response for wavelength dispersion compensation, in accordance with the respective components. The demodulation digital signal processing unit A splits, into 4N signals, each of the convoluted real component $XI_i$, imaginary component $XQ_i$, real component $YI_i$, and imaginary component $YQ_i$. The demodulation digital signal processing unit A inputs 2N of the split 4N signals as-is to the adaptive equalization unit 534, and converts the 2N remaining signals to phase-conjugated signals and inputs the converted signals to the adaptive equalization unit 534. The phase conjugations of the real component $XI_i$, the imaginary component $XQ_i$, the real component $YI_i$, and the imaginary component $YQ_i$ are denoted as a real component phase conjugation $XI_i*$, an imaginary component phase conjugation $XQ_i*$, a real component phase conjugation $YI_i*$, and an imaginary component phase conjugation $YQ_i*$. Each of 2N sets consisting of the real component $XI_i$, the imaginary component $XQ_i$, the real component $YI_i$, the imaginary component $YQ_i$, the real component phase conjugation $XI_i*$, the imaginary component phase conjugation $XQ_i*$, the real component phase conjugation $YI_i*$, and the imaginary component phase conjugation $YQ_i*$ corresponds to an X-polarization component and a Y-polarization components of the N polarization-multiplexed reception signals.

The adaptive equalization unit 534 convolutes, with the impulse response, each of the 2N real components $XI_1$ to $XI_N$, imaginary components $XQ_i$ to $XQ_N$, real components $YI_i$ to $YI_N$, imaginary components $YQ_i$ to $YQ_N$, real component phase conjugations $XI_1*$ to $XI_N*$, imaginary component phase conjugations $XQ_1*$ to $XQ_N*$, real component phase conjugations $YI_1*$ to $YI_N*$, and imaginary component phase conjugations $YQ_1*$ to $YQ_N*$. The impulse responses with which the respective components and phase conjugations are convoluted are expressed as elements of the inverse matrix of the matrix W in the formula (5), which is expressed as 4N×4N. For each polarization of each polarization-multiplexed reception signal, the adaptive equalization unit 534 adds together the real components $XI_1$ to $XI_N$, the imaginary components $XQ_1$ to $XQ_N$, the real components $YI_1$ to $YI_N$, and the imaginary components $YQ_1$ to $YQ_N$ that are convolved with the impulse responses corresponding to the polarization and the respective components, and applies a phase rotation for frequency offset compensation to generate a first addition signal. Similarly, for each polarization of each polarization-multiplexed reception signal, the adaptive equalization unit 534 adds together the real component phase conjugations $XI_1^*$ to $XI_N^*$, the imaginary component phase conjugations $XQ_1^*$ to $XQ_N^*$, the real component phase conjugations $YI_1^*$ to $YI_N^*$, and the imaginary component phase conjugations $YQ_1^*$ to $YQ_N^*$ that are convoluted with the impulse responses corresponding to the polarization and the respective phase conjugations, and applies a phase rotation opposite to the phase rotation for frequency offset compensation to generate a second addition signal. After adding together the first addition signal and the second addition signal generated for each polarization of each polarization-multiplexed reception signal to obtain a reception signal, the adaptive equalization unit 534 adds (or subtracts) a transmission data bias correction signal for the polarization to perform distortion correction.

According to the above-described embodiment, a signal processing device included in a receiver includes a first compensation unit, an input signal generation unit, an equalization unit, and a second compensation unit. In the case where the receiver receives a polarization-multiplexed signal for single-mode fiber transmission, for example, the signal processing device is the digital signal processing unit 530, the first compensation unit is the front-end correction unit 532 and the wavelength dispersion compensation unit 533, the input signal generation unit is the wavelength dispersion compensation unit 533, the equalization unit is the adaptive equalization unit 534, and the second compensation unit is the frequency and phase offset compensation unit 535.

The first compensation unit convolutes each of a real component and an imaginary component of each polarization of a polarization-multiplexed reception signal with an impulse response for compensating for frequency characteristics of a receiver and a complex impulse response for wavelength dispersion compensation. The input signal generation unit generates, as input signals, the convoluted real component and imaginary component of each polarization, and phase conjugations of the convoluted real component and imaginary component of each polarization, for each polarization. The equalization unit generates, for each polarization, a first addition signal obtained by multiplying each of the real component and the imaginary component of each polarization included in the input signals by a complex impulse response, thereafter adding together the multiplied real component and imaginary component, and further applying a phase rotation for frequency offset compensation to the added components, and a second addition signal obtained by multiplying each of the phase conjugation of the real component of and the phase conjugation of the imaginary component of each polarization included in the input signals by a complex impulse response, thereafter adding together the multiplied phase conjugations, and further applying a phase rotation opposite to the phase rotation for frequency offset compensation to the added phase conjugations. The second compensation unit adds or subtracts a transmission data bias correction signal to or from a signal obtained by adding together the first addition signal and the second addition signal.

Alternatively, the receiver that includes the signal processing device receives the polarization-multiplexed reception signals that are spatially N-multiplexed. The first compensation unit convolutes each of a real component and an imaginary component of each polarization included in N (N is an integer of 2 or more) polarization-multiplexed reception signals that are spatially multiplexed with an impulse response for compensating for frequency characteristics of a receiver and a complex impulse response for wavelength dispersion compensation. The input signal generation unit generates, as input signals, the convoluted real component and imaginary component of each polarization of each of the N polarization-multiplexed reception signals, and phase conjugations of the convoluted real component and imaginary component of each polarization of each of the N polarization-multiplexed reception signals, for each polarization of each of the N polarization-multiplexed reception signals; Thus, 8N signals are generated as input signal for each polarization component of each polarization-multiplexed reception signal, and 16N signals serve as input signals for one polarization-multiplexed reception signal constituted by an X-polarization component and a Y-polarization component. The equalization unit generates, for each polarization of each of the N polarization-multiplexed reception signals, a first addition signal obtained by multiplying each of the real component and the imaginary component of each polarization included in the input signals generated for the polarization by a complex impulse response, thereafter adding together the multiplied real component and imaginary component, and further applying a phase rotation for frequency offset compensation to the added components. Also, the equalization unit generates, for each polarization of each of the N polarization-multiplexed reception signals, a second addition signal obtained by multiplying each of the phase conjugation of the real component and the phase conjugation of the imaginary component of N polarizations included in the input signals generated for the polarization by a complex impulse response, thereafter adding together the multiplied phase conjugations, and further applying a phase rotation opposite to the phase conjugation for frequency offset compensation to the added phase conjugations. The second compensation unit adds or subtracts, for each polarization of each of the N polarization-multiplexed reception signals, a transmission data bias correction signal to or from a signal obtained by adding together the first addition signal and the second addition signal that are generated for the polarization.

Note that the complex impulse response is dynamically updated. Also, the second compensation unit adaptively adds or subtracts the transmission data bias correction signal.

Although the embodiments of this invention have been described above in detail with reference to the drawings, the specific configuration is not limited to these embodiments, and also encompasses design or the like within the scope that does not deviate from the gist of this invention.

REFERENCE SIGNS LIST

1 Digital coherent optical transmission system
10 Transmitter
20 WDM multiplexer
30 Optical fiber transmission path
31 Optical amplifier
40 WDM demultiplexer
50 Receiver
100 Transmission unit
110 Digital signal processing unit
111 Encoding unit
112 Mapping unit
113 Training signal insertion unit
114 Sampling frequency changing unit
115 Waveform shaping unit
116 Pre-equalization unit
117-1 to 117-4 Digital-analog converter
120 Modulator driver
121-1 to 121-4 Amplifier 130 Light source
140 Integrated module
141-1, 141-2 IQ modulator
142 Polarization combining unit
500 Receiving unit
510 Local oscillator light source
520 Optical front end
521 Polarization separating unit
522-1, 522-2 Optical 90-degree hybrid coupler
523-1 to 523-4 BPD
524-1 to 524-4 Amplifier
530 Digital signal processing unit
531-1 to 531-4 Analog-to-digital converter
532 Front-end correction unit
533 Wavelength dispersion compensation unit
534 Adaptive equalization unit
535 Frequency and phase offset compensation unit
536 Demapping unit
537 Decoding unit

The invention claimed is:

1. A signal processing method comprising: a first compensation step of convoluting each of a real component and an imaginary component of each polarization of a polarization-multiplexed reception signal with an impulse response for compensating for frequency characteristics of a receiver and a complex impulse response for wavelength dispersion compensation; an input signal generation step of generating, as input signals, the convoluted real component and imaginary component of each polarization, and phase conjugations of the convoluted real component and imaginary component of each polarization, for each polarization; an equalization step of generating, for each polarization, a first addition signal obtained by multiplying each of the real component and the imaginary component of each polarization included in the input signals by a complex impulse response, thereafter adding together the multiplied real component and imaginary component, and further applying a phase rotation for frequency offset compensation to the added components, and a second addition signal obtained by multiplying each of the phase conjugation of the real component of and the phase conjugation of the imaginary component of each polarization included in the input signals by a complex impulse response, thereafter adding together the multiplied phase conjugations, and further applying a phase rotation opposite to the phase rotation for frequency offset compensation to the added phase conjugations; and a second compensation step of adding or subtracting a transmission data bias correction signal to or from a signal obtained by adding together the first addition signal and the second addition signal, for each polarization.

2. The signal processing method according to claim 1, wherein the receiver receives the polarization-multiplexed reception signal using an optical signal.

3. A signal processing method comprising: a first compensation step of convoluting each of a real component and an imaginary component of each polarization included in N (N is an integer of 2 or more) polarization-multiplexed reception signals that are spatially multiplexed with an impulse response for compensating for frequency characteristics of a receiver and a complex impulse response for wavelength dispersion compensation; an input signal generation step of generating, as input signals, the convoluted real component and imaginary component of each polarization of each of the N polarization-multiplexed reception signals, and phase conjugations of the convoluted real component and imaginary component of each polarization of each of the N polarization-multiplexed reception signals; an equalization step of performing, for each polarization of each of the N polarization-multiplexed reception signals, processing for generating a first addition signal obtained by multiplying each of the real component and the imaginary component of each polarization included in the input signals of the polarization by a complex impulse response, thereafter adding together the multiplied real component and imaginary component, and further applying a phase rotation for frequency offset compensation to the added components, and performing, for each polarization of each of the N polarization-multiplexed reception signals, processing for generating a second addition signal obtained by multiplying each of the phase conjugation of the real component and the phase conjugation of the imaginary component of each polarization included in the input signals of the polarization by a complex impulse response, thereafter adding together the multiplied phase conjugations, and further applying a phase rotation opposite to the phase conjugation for frequency offset compensation to the added phase conjugations; and a second compensation step of adding or subtracting, for each polarization of each of the N polarization-multiplexed reception signals, a transmission data bias correction signal to or from a signal obtained by adding together the first addition signal and the second addition signal that are generated for the polarization.

4. The signal processing method according to claim 1, wherein the complex impulse response is dynamically updated, and in the second compensation step, the transmission data bias correction signal is adaptively added or subtracted.

5. A signal processing device comprising:
a processor; and
a storage medium having computer program instructions stored thereon, when executed by the processor, perform to:
convoluting each of a real component and an imaginary component of each polarization of a polarization-multiplexed reception signal with an impulse response for compensating for frequency characteristics of a receiver and a complex impulse response for wavelength dispersion compensation; generating, as input signals, the convoluted real component and imaginary component of each polarization, and phase conjugations of the convoluted real component and imaginary component of each polarization, for each polarization; generating, for each polarization, a first addition signal obtained by multiplying each of the real component and the imaginary component of each polarization included in the input signals by a complex impulse response, thereafter adding together the multiplied real component and imaginary component, and further applying a phase rotation for frequency offset compensation to the added components, and a second addition signal obtained by multiplying each of the phase conjugation of the real component of and the phase conjugation of the imaginary component of each polarization included in the input signals by a complex impulse response, thereafter adding together the multiplied phase conjugations, and further applying a phase rotation opposite to the phase rotation for frequency offset compensation to the added phase conjugations; and adding or subtracting a transmission data bias correction signal to or from a signal obtained by adding together the first addition signal and the second addition signal, for each polarization.

6. A communication system comprising: a transmitter; and a receiver having the signal processing device according to claim 5.

\* \* \* \* \*